(12) United States Patent
Yoo et al.

(10) Patent No.: US 10,776,048 B2
(45) Date of Patent: Sep. 15, 2020

(54) ELECTRONIC APPARATUS AND OPERATING METHOD THEREOF

(71) Applicant: SK hynix Inc., Gyeonggi-do (KR)

(72) Inventors: Injae Yoo, Mountain View, CA (US); Dong Yeob Chun, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/198,079

(22) Filed: Nov. 21, 2018

(65) Prior Publication Data

US 2019/0265911 A1   Aug. 29, 2019

(30) Foreign Application Priority Data

Feb. 26, 2018 (KR) ........................ 10-2018-0022814

(51) Int. Cl.
*G06F 3/06* (2006.01)
(52) U.S. Cl.
CPC .......... *G06F 3/0659* (2013.01); *G06F 3/0604* (2013.01); *G06F 3/0688* (2013.01)
(58) Field of Classification Search
CPC ..... G06F 3/0688; G06F 3/0659; G06F 3/0604

USPC .................................................. 711/103
See application file for complete search history.

(56) References Cited

U.S. PATENT DOCUMENTS

2017/0134310 A1   5/2017   Koladi et al.
2019/0108889 A1*  4/2019   Gholamipour ..... G11C 13/0033

* cited by examiner

*Primary Examiner* — Hua J Song
(74) *Attorney, Agent, or Firm* — IP & T Group LLP

(57) ABSTRACT

An electronic apparatus includes a data storage device including a plurality of plane groups and a controller configured to control the data storage device. The controller includes a temporary storage configured to store a command received from a host apparatus, a processor configured to define a plurality of queue regions corresponding to the plurality of plane groups within the temporary storage, and queue the command for each of the plurality of plane groups to a queue region matching with a corresponding plane group, and a plurality of pointer registers corresponding to the plurality of queue region, respectively, and configured to indicate positions of the plurality of queue regions. The processor changes a number of the queue regions, sizes of the queue regions, and sizes of the pointer registers according to a number of the plane groups.

18 Claims, 15 Drawing Sheets

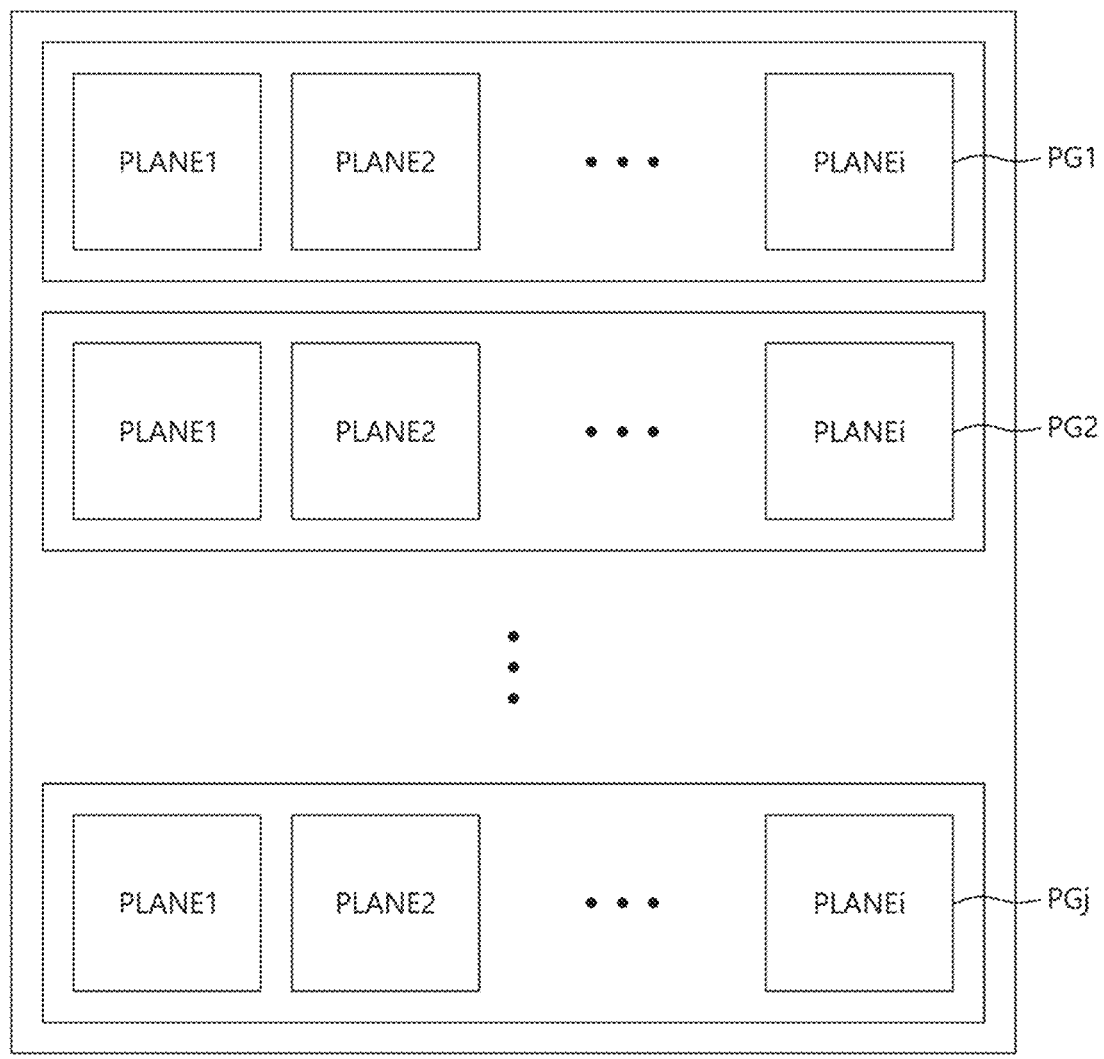

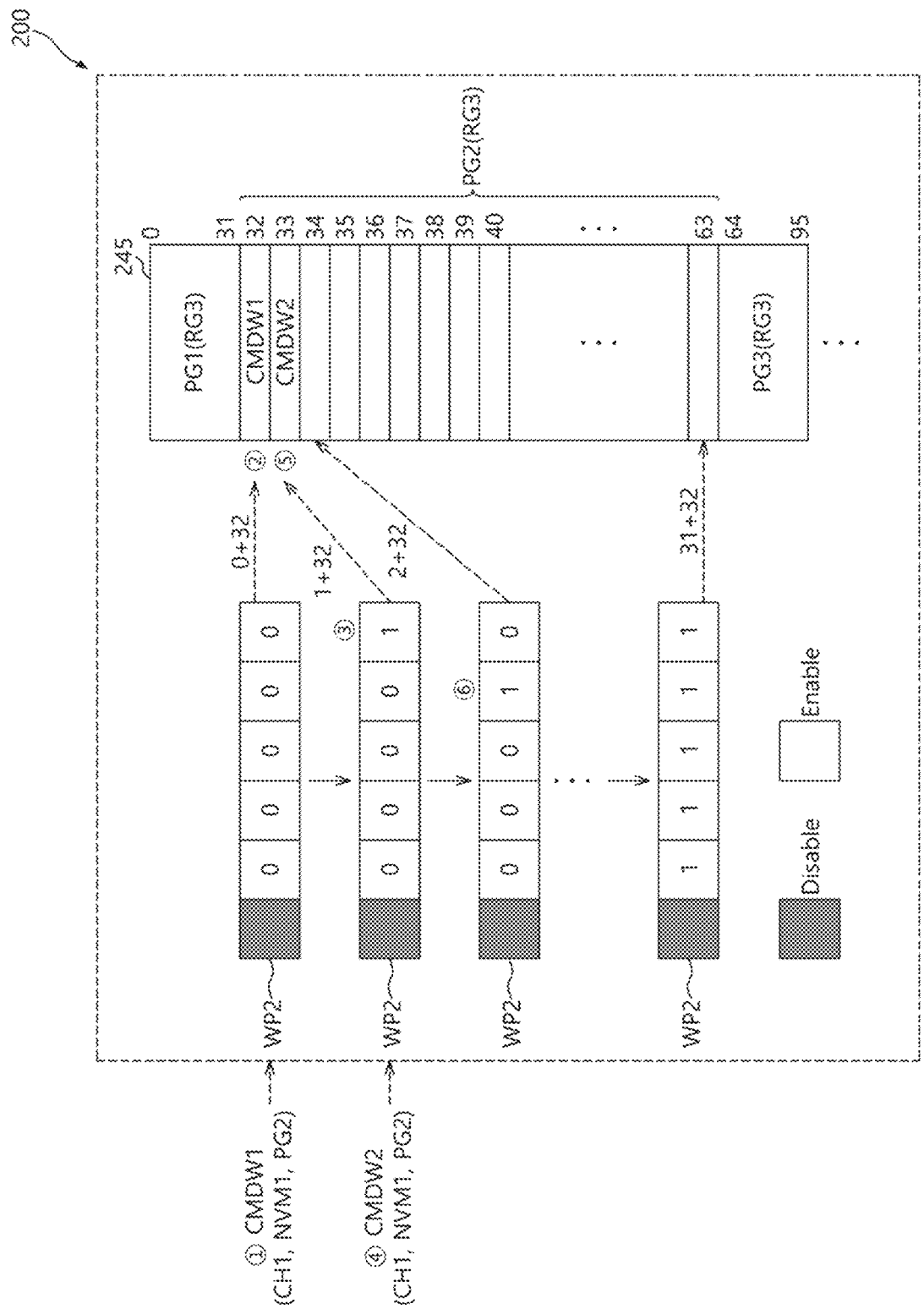

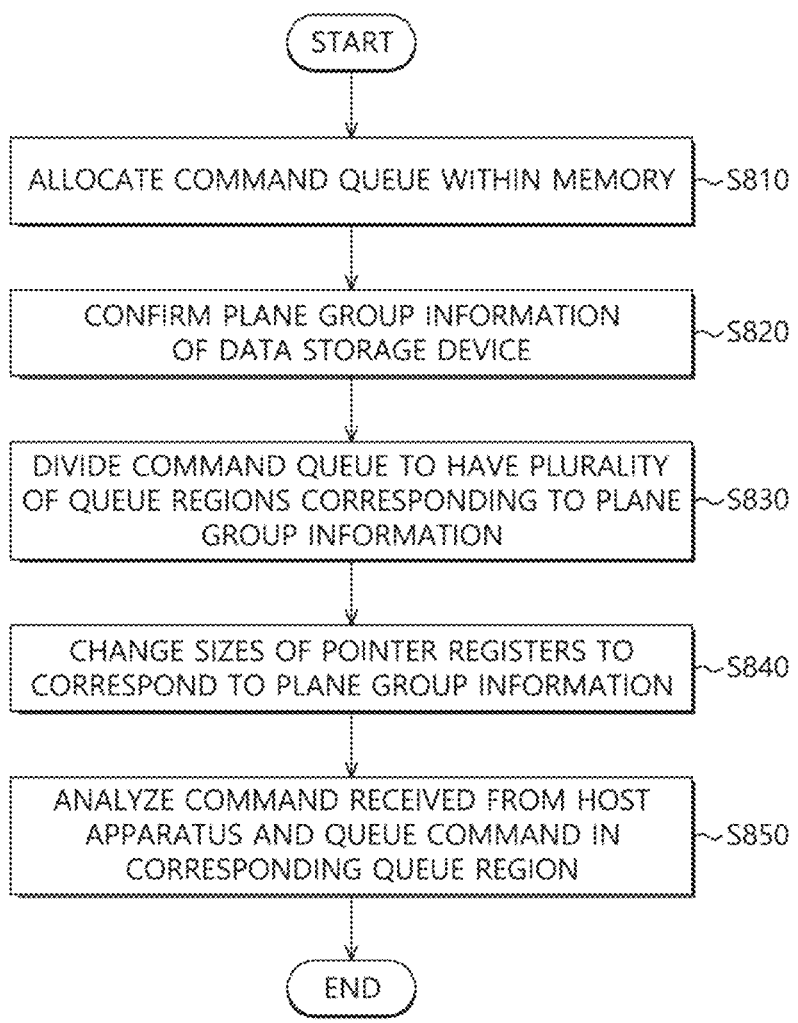

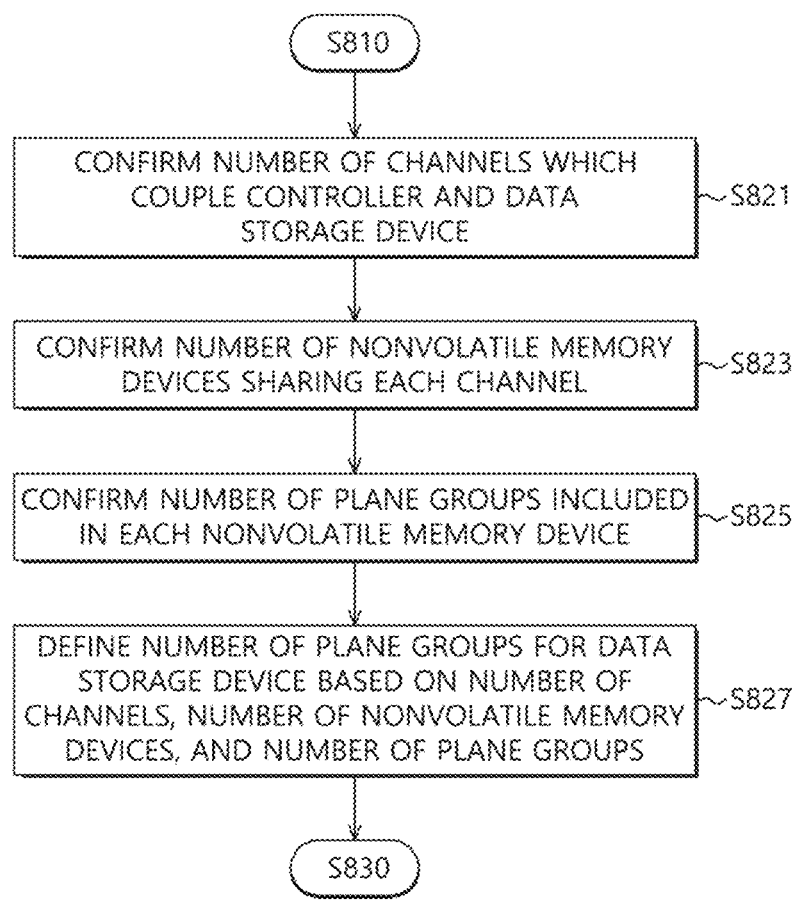

ELECTRONIC APPARATUS AND OPERATING METHOD THEREOF

CROSS-REFERENCES TO RELATED APPLICATION

The present application claims priority under 35 U.S.C. § 119(a) to Korean patent application number 10-2018-0022814, filed on Feb. 26, 2018, which is incorporated herein by reference in its entirety.

BACKGROUND

1. Technical Field

Various embodiments generally relate to an electronic apparatus, and more particularly, to an electronic apparatus including a data storage device and an operating method thereof.

2. Related Art

In recent years, the paradigm for computer environments changed to ubiquitous computing which may use computer systems every time everywhere. As a result, use of portable electronic apparatuses such as a mobile phone, a digital camera, and a laptop computer has been increasing rapidly. Generally, portable electronic apparatuses use electronic apparatuses including data storage devices to store data.

Electronic apparatuses including data storage devices have no mechanical driving units and exhibit good stability and endurance, fast information access rate, and low power consumption. Such electronic apparatuses may include a universal serial bus (USB) memory device, a memory card having various interfaces, a universal flash storage (UFS) device, a solid-state drive (SSD), and the like.

SUMMARY

Embodiments are provided to an electronic apparatus capable of efficiently using a queue region allocated within a temporary storage device and an operating method thereof.

In an embodiment of the present disclosure, an electronic apparatus may include: a data storage device including a plurality of plane groups; and a controller configured to control the data storage device. The controller may include a temporary storage configured to store a command received from a host apparatus; a processor configured to define a plurality of queue regions corresponding to the plurality of plane groups within the temporary storage, and queue the command for each of the plurality of plane groups to a queue region matching with a corresponding plane group; and a plurality of pointer registers corresponding to the plurality of queue regions, respectively, and configured to indicate positions of the plurality of queue regions. The processor may change a number of the queue regions, sizes of the queue regions, and sizes of the pointer registers according to a number of the plane groups.

In an embodiment of the present disclosure, an electronic apparatus may include: a controller; and a non-transitory machine-readable storage medium including a plurality of plane groups, and configured to store code-type instructions that are driven by the controller. The code-type instructions may include an instruction which allocates a portion of a temporary storage included in the controller as an entire queue region; an instruction which confirms information of the plurality of plane groups of the non-transitory machine-readable storage medium; an instruction which defines the entire queue region by dividing the entire queue region into a plurality of queue regions corresponding to the plurality of plane groups and having a variable size according to the information of the plurality of plane groups; and an instruction which analyzes a command received from a host apparatus and stores the analyzed command in a queue region matching with a corresponding plane group.

In an embodiment of the present disclosure, an operating method of an electronic apparatus, the method may include: allocating an entire queue region to a temporary storage included in a controller; confirming plane group information of the data storage device; defining the entire queue region by dividing the entire queue region into a plurality of queue regions which correspond to the plane group information and have a variable size; and analyzing a command received from a host apparatus and storing the command in a corresponding queue region having the variable size.

In an embodiment of the present disclosure, an electronic apparatus may include: a data storage device including a plurality of plane groups; and a controller suitable for defining a plurality of queue regions corresponding to the plurality of plane groups, and queuing a command for each of the plurality of plane groups to a corresponding queue region.

The controller changes a number of the queue regions according to a number of the plane groups. The controller includes a temporary storage and a processor for defining the plurality of queue regions within the temporary storage, and for queuing the commands to the queue regions. The controller further includes a plurality of pointer registers corresponding to the plurality of queue regions, and configured to indicate positions of the plurality of queue regions.

The processor allocates a portion of the temporary storage as an entire queue region, and defines the entire queue region by dividing the entire queue region into the plurality of queue regions. The entire queue region is allocated with the same size regardless of the number of the plane groups. The processor increases the number of the queue regions and reduces a size of each queue region as the number of the plane groups is increased.

The electronic apparatus further includes a plurality of channels which couple the controller and the data storage device, wherein the data storage device includes a plurality of memory groups each including a plurality of nonvolatile memory devices sharing a corresponding channel among the plurality of channels. The number of the plane groups is changed according to a number of the channels, a number of the nonvolatile memory devices, and the number of the plane groups included in each nonvolatile memory device.

The processor changes sizes of the plurality of pointer registers by enabling or disabling partial bits of the plurality of pointer registers according to the number of the plane groups. The processor sequentially enables the disabled bits of the plurality of pointer registers from a least significant bit as the number of the plane groups is reduced, and sequentially disables the enabled bits of the plurality of pointer registers from a most significant bit as the number of the plane groups is increased.

The plurality of pointer registers include: a plurality of write pointer registers storing an address corresponding to a position in which the command is to be queued for the plurality of queue regions; and a plurality of read pointer registers storing an address corresponding to a position in which the command is to be dequeued for the plurality of queue regions is stored.

The temporary storage includes a plurality of address ports. The plurality of write pointer registers correspond to any one of the plurality of address ports and the plurality of read pointer registers correspond to another one of the plurality of address ports.

In accordance with embodiments, even when the number of channels, the number of nonvolatile memory devices, and the number of plane groups included in the nonvolatile memory device are changed according to design change, a command queue may be used by changing an inner space of the command queue to a corresponding type. Accordingly, the command queue allocated with a limited size may be efficiently utilized and the performance of an electronic apparatus may be improved.

These and other features, aspects, and embodiments are described below in detailed description section of the present disclosure.

BRIEF DESCRIPTION OF THE DRAWINGS

The above and other aspects, features and advantages of the subject matter of the present disclosure will be more clearly understood from the following detailed description taken in conjunction with the accompanying drawings, in which:

FIG. 4 is a diagram illustrating a nonvolatile memory device in accordance with an embodiment of the present disclosure.

FIGS. 7A and 7B are diagrams illustrating a method of storing a command entry in a command queue with reference to a write pointer register in accordance with an embodiment of the present disclosure.

FIG. 8a is a flowchart illustrating an operation method of an electronic apparatus in accordance with an embodiment of the present disclosure.

FIG. 8B is a detailed flowchart illustrating a process of confirming plane group information of a data storage device in operation S820 of FIG. 8A.

DETAILED DESCRIPTION

Figure 1:
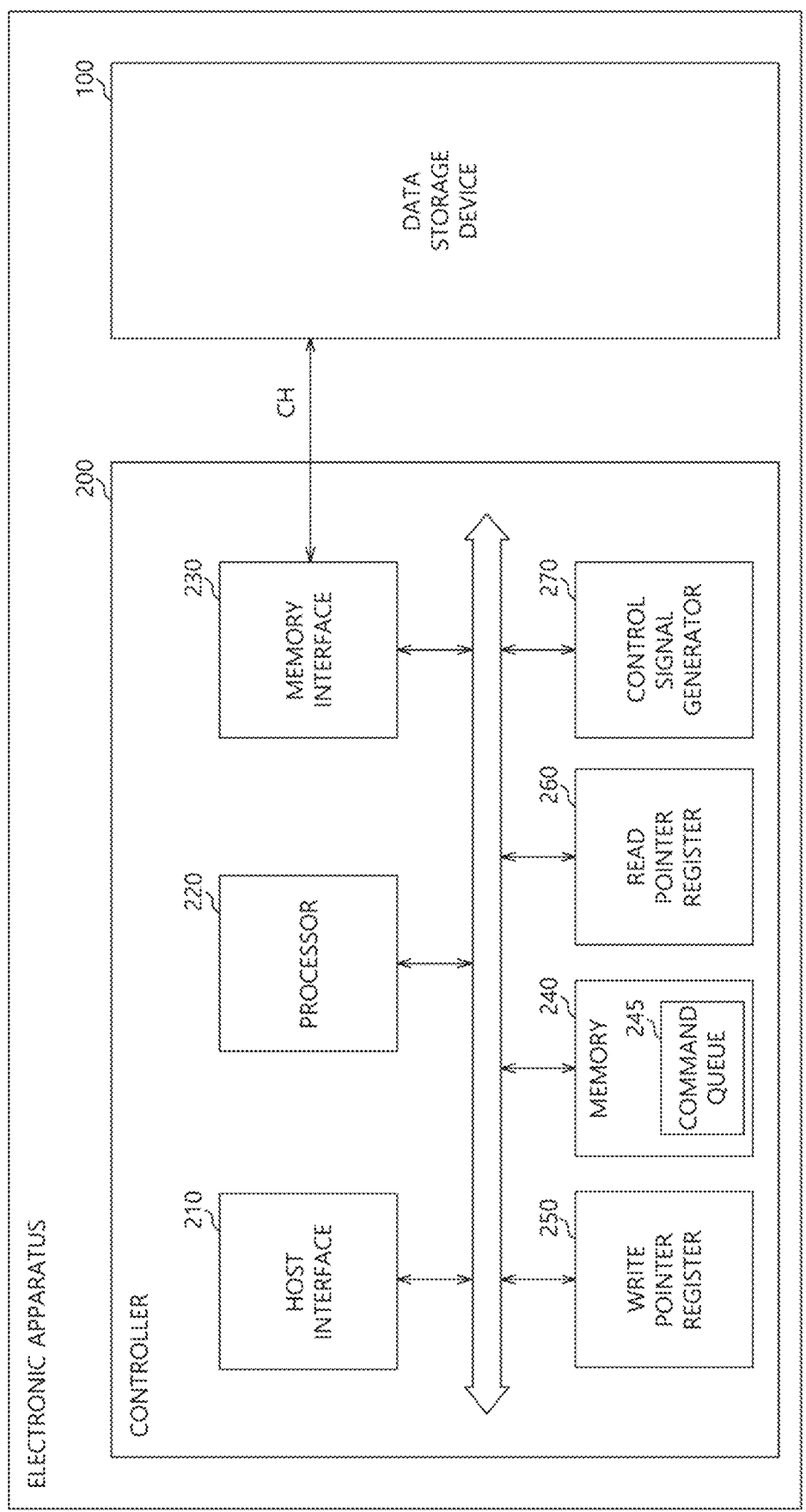
FIG. 1 is a block diagram illustrating an electronic apparatus in accordance with an embodiment of the present disclosure.

Various embodiments of the present invention will be described in greater detail with reference to the accompanying drawings. The drawings are schematic illustrations of various embodiments (and intermediate structures). As such, variations from the configurations and shapes of the illustrations as a result, for example, of manufacturing techniques and/or tolerances, are to be expected. Thus, the described embodiments should not be construed as being limited to the particular configurations and shapes illustrated herein but may include deviations in configurations and shapes which do not depart from the spirit and scope of the present invention as defined in the appended claims.

The present invention is described herein with reference to cross-section and/or plan illustrations of idealized embodiments of the present invention. However, embodiments of the present invention should not be construed as limiting the inventive concept. Although a few embodiments of the present invention will be shown and described, it will be appreciated by those of ordinary skill in the art that changes may be made in these embodiments without departing from the principles and spirit of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention.

As used herein, singular fog ms are intended to include the plural forms as well, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

FIG. 1 is a block diagram illustrating a configuration example of an electronic apparatus 10 in accordance with an embodiment of the present disclosure. The electronic apparatus 10 may store data to be accessed by a host apparatus (not shown) such as a mobile phone, an MP3 player, a laptop computer, a desktop computer, a game player, a television (TV), an in-vehicle infotainment system, and/or the like. The electronic apparatus 10 may refer to a memory system.

The electronic apparatus 10 may be manufactured as any one among various types of storage devices according to a host interface which refers to a transfer protocol with a host apparatus (not shown). For example, the electronic apparatus 10 may be configured of any one of various types of storage devices, such as a solid-state drive (SSD), a multimedia card in the form of an MMC, an eMMC, an RS-MMC, and a micro-MMC, a secure digital card in the form of an SD, a mini-SD, and a micro-SD, a universal serial bus (USB) storage device, a universal flash storage (UFS) device, a personal computer memory card international association (PCMCIA) card type storage device, a peripheral component interconnection (PCI) card type storage device, a PCI-express (PCI-E) card type storage device, a compact flash (CF) card, a smart media card, a memory stick, and the like.

The electronic apparatus 10 may be manufactured as any one among various types of packages, such as a package on package (POP), a system in package (SIP), a system on chip (SOC), a multi-chip package (MCP), a chip on board (COB), a wafer-level fabricated package (WFP), and a wafer-level stack package (WSP).

Referring to FIG. 1, the electronic apparatus 10 may include a data storage device 100 and a controller 200.

The data storage device 100 may be operated as a storage medium of the electronic apparatus 10. The data storage device 100 may refer to a non-transitory machine-readable storage medium. The data storage device 100 may include any one of various types of nonvolatile memory devices, such as a NAND flash memory device, a NOR flash memory device, a ferroelectric random-access memory (FRAM) using a ferroelectric capacitor, a magnetic random-access memory (MRAM) using a tunneling magneto-resistive (TMR) layer, a phase-change random-access memory (PRAM) using a chalcogenide alloy, and a resistive random-access memory (RERAM) using a transition metal oxide.

Figure 2:
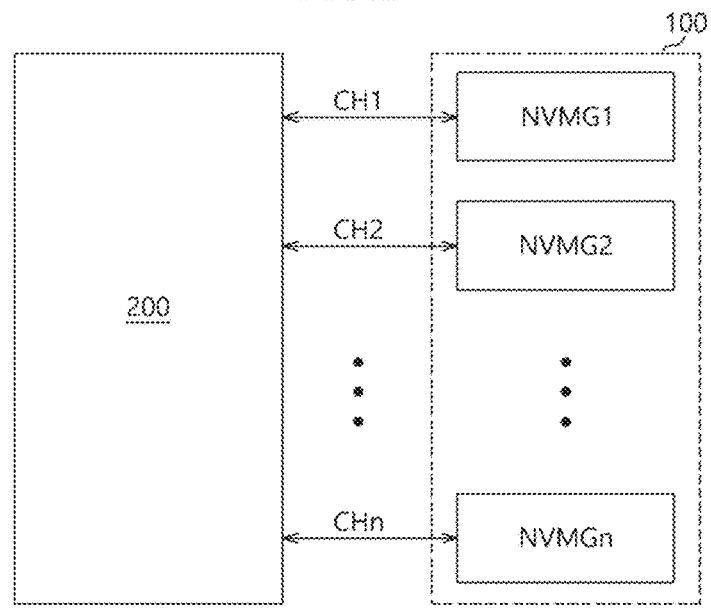
FIG. 2 is a diagram illustrating a plurality of channels and a plurality of nonvolatile memory groups coupled to each channel in accordance with an embodiment of the present disclosure.
Figure 3:
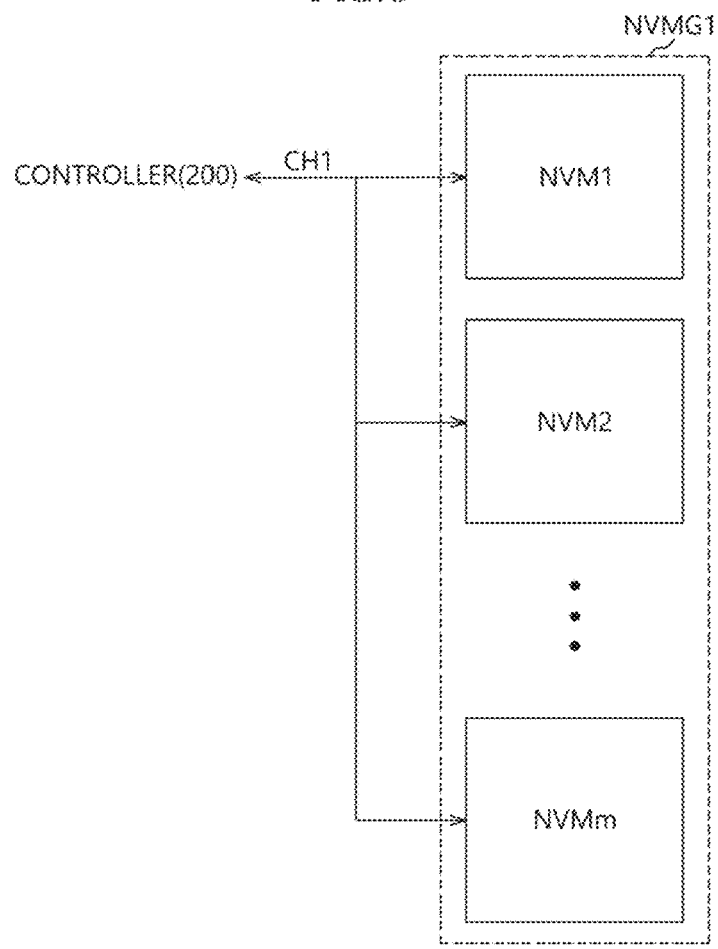
FIG. 3 is a diagram illustrating a plurality of nonvolatile memory devices sharing one channel in accordance with an embodiment of the present disclosure.

FIG. 2 is a diagram explaining an example of a plurality of channels and a plurality of nonvolatile memory groups coupled to each channel in accordance with an embodiment of the present disclosure, and FIG. 3 is a diagram illustrating an example of a plurality of nonvolatile memory devices sharing one channel in accordance with an embodiment of the present disclosure.

Referring to FIGS. 2 and 3, the data storage device 100 may include a plurality of nonvolatile memory groups NVMG1 to NVMGn. Each of the plurality of nonvolatile memory groups NVMG1 to NVMGn may include a plurality of nonvolatile memory devices NVM1 to NVMm. Channels CH1 to CHn for coupling with the controller 200 may be provided for the respective nonvolatile memory groups NVMG1 to NVMGn, but this is not limited thereto. The plurality of nonvolatile memory devices NVM1 to NVMm included in one nonvolatile memory group NVMG1 may be coupled to the controller 200 through one channel CH1. For example, the plurality of nonvolatile memory devices NVM1 to NVMm included in each of the nonvolatile memory groups NVMG1 to NVMGn may share a corresponding channel among the plurality of channels CH1 to CHn.

Referring to FIG. 3, the controller 200 may provide commands to the nonvolatile memory devices NVM1 to NVMm coupled through the channel CH1 and operations corresponding to the commands may be simultaneously performed in the plurality of nonvolatile memory devices NVM1 to NVMm which receive the commands.

FIG. 4 is a diagram illustrating a configuration example of a nonvolatile memory device in accordance with an embodiment of the present disclosure.

Referring to FIG. 4, the nonvolatile memory device NVM may include a plurality of plane groups PG1 to PGj. Each of the plane groups PG1 to PGj may include a plurality of planes PLANE1 to PLANEi. A minimal unit on which an operation corresponding to one command is performed in the nonvolatile memory device NVM may be the plane group, but this is not limited thereto. For clarity, it is assumed in the embodiment that the minimal unit on which the operation corresponding to one command is performed is the plane group.

For example, a command received from a host apparatus may include channel information (e.g., first channel CH1), nonvolatile memory device information (e.g., first nonvolatile memory device NMV1), and plane group information (e.g., first plane group PG1). An operation corresponding to the command may be simultaneously performed in the plurality of planes PLANE1 to PLANEi included in the first plane group PG1 among the plane groups PG1 to PGj included in the first nonvolatile memory device NVM1 among the plurality of nonvolatile memory devices NVM1 to NVMm coupled to the first channel CH1.

Although not specifically shown in FIG. 4, the nonvolatile memory device NVM may include a memory cell array (not shown) including a plurality of memory cells (not shown) arranged in regions in which a plurality of word lines (not shown) and a plurality of bit lines (not shown) cross each other. Each of the plurality of planes PLANE1 to PLANEi in each of the plane groups PG1 to PGj may include a plurality of memory blocks and each of the plurality of memory blocks may include a plurality of pages.

For example, each of the memory cells in the memory cell array may be at least one among a single level cell (SLC) storing 1-bit data, a multilevel cell (MLC) storing 2-bit data, a triple level cell (TLC) storing 3-bit data, and a quadruple level cell QLC storing 4-bit data. The memory cell array may include at least two or more cells among the SLC, the MLC, the TLC, and the QLC. For example, the memory cell array may have a two-dimensional (2D) horizontal structure or a 3D vertical structure.

Referring back to FIG. 1, the controller 200 may include a host interface 210, a processor 220, a memory interface 230, a memory 240, a write pointer register 250, a read pointer register 260, and a control signal generator 270. The memory 240 may include a command queue 245.

The host interface 210 may perform interfacing between a host apparatus (not shown) and the electronic apparatus 10. For example, the host interface 210 may communicate with the host apparatus through any one among standard transfer protocols such as a USB protocol, a UFS protocol, an MMC protocol, a parallel advanced technology attachment (PATA) protocol, a serial advanced technology attachment (SATA)

protocol, a small computer system interface (SCSI) protocol, a serial attached SCSI (SAS) protocol, a PCI protocol, and a PCI-E protocol.

The processor 220 may be configured of a micro control unit (MCU) and/or a central processing unit (CPU). The processor 220 may process a request received from a host apparatus. To process the request transmitted from the host apparatus, the processor 220 may drive code-type instructions or algorithms (for example, software) loaded into the memory 240 and control internal function blocks and the data storage device 100.

The electronic apparatus 10 may start a boot-up when a power is supplied or a reboot is performed. For example, the electronic apparatus 10 may load a boot loader into the memory 240 from a read only memory (ROM) (not shown). The electronic apparatus 10 may complete the boot-up by loading the code-type instructions into the memory 240 from the data storage device 100 using the boot loader.

The code-type instructions loaded into the memory 240 may control operations of various types of function blocks within the controller 200 and the data storage device 100. The instructions may include an instruction (hereinafter, referred to as a 'queue allocation instruction') which allocates a portion of the memory 240 as the command queue 245, an instruction (hereinafter, referred to as an 'information confirm instruction') which confirms information of the plurality of plane groups included in the data storage device 100, an instruction (hereinafter, referred to as a 'queue division instruction') which defines the command queue 245 by dividing the command queue 245 into a plurality of queue regions corresponding to the plane groups based on the information of the plurality of plane groups included in the data storage device 100, an instruction (hereinafter, referred to as a 'queuing instruction') which queues the command received from the host apparatus to a queue region matching with a corresponding plane group by analyzing the command, an instruction (hereinafter, referred to as a 'pointer change instruction') which changes sizes of a plurality of pointer registers indicating the positions of the queue regions of the command queue 245, and the like. However, the instructions are not limited thereto and the queue allocation instruction, the information confirm instruction, the queue division instruction, the queuing instruction, and the pointer change instruction may be driven by the processor 220 to perform the above-described operations.

The memory interface 230 may control the data storage device 100 according to control of the processor 220. The memory interface 230 may refer to a memory controller. The memory interface 230 may provide control signals to the data storage device 100. The control signals may include a command for controlling the data storage device 100 to perform operations corresponding to requests received from the host apparatus. The command may include an operation code (for example, information indicating an operation type to be performed), address information for a region on which an operation is to be performed, and the like, but this is not limited thereto. The memory interface 230 may provide data to the data storage device 100 or receive data from the data storage device 100. The memory interface 230 may be coupled to the data storage device 100 through at least one or more channels.

The memory 240 may include a dynamic random-access memory (DRAM) and/or a static random-access memory (SRAM). The memory 240 may include a region into which software (for example, code-type instructions) driven by the processor 220 is to be loaded. The memory 240 may include a region for storing meta data required for driving the software. For example, the memory 240 may be operated as a working memory of the processor 220.

The memory 240 may include a region for temporarily storing data to be written to the data storage device 100 or data read from the data storage device 100. For example, the memory 240 may serve as a buffer memory referred to as a temporary storage.

The command queue 245 may queue the commands received from the host apparatus. The command queue 245 may correspond to a region allocated with a certain size in the memory 240. The allocating of a portion of the memory 240 as the command queue 245 may be performed through the queue allocation instruction driven by the processor 220. The command queue 245 may have a physically fixed size. The command queue 245 may be divided into a plurality of queue regions. The dividing of the command queue 245 into the plurality of queue regions may be performed through the queue division instruction driven by the processor 220. The number and size of the plurality of queue regions included in the command queue 245 may be varied according to the number of channels, the number of nonvolatile memory devices coupled to each channel, and the number of plane groups included in each nonvolatile memory device. The command queue 245 may be divided into first queue regions corresponding to the number of channels, second queue regions corresponding to the number of nonvolatile memory devices, and third queue regions corresponding to the number of plane groups of each nonvolatile memory device.

For example, the information confirm instruction driven by the processor 220 may confirm the number of channels CH which couple the controller 200 and the data storage device 100, the number of nonvolatile memory devices NVM sharing each channel CH, and the number of plane groups PG included in each nonvolatile memory device NVM and determine the total number of plane groups PG included in the data storage device 100.

The queue division instruction driven by the processor 220 may divide the command queue 245 to have the plurality of queue regions corresponding to the total number of plane groups PG included in the data storage device 100 which is determined through the information confirm instruction. Accordingly, the command queue 245 may have the first queue regions (see RG1 of FIG. 5A) corresponding to the number of channels CH, each of the first queue regions RG1 may have the second queue regions (see RG2 of FIG. 5A) corresponding to the number of nonvolatile memory devices NVM, and each of the second queue regions RG2 may have the third queue regions (see RG3 of FIG. 5A) corresponding to the number of plane groups PG included in each nonvolatile memory device NVM. The total queue regions included in the command queue 245 may correspond to a value that the number of first queue regions, the number of second queue regions, and the number of third queue regions are multiplied by each other.

The number of channels which couple the controller 200 and the data storage device 100, the number of nonvolatile memory devices NVM sharing each channel CH, and the number of plane groups PG included in each nonvolatile memory device NVM may be changed according to the design of the semiconductor apparatus (for example, electronic apparatus). When at least one or more numbers among the number of channels CH, the number of nonvolatile memory devices NVM, and the number of plane groups PG are changed according to the change in the design of the semiconductor apparatus in a state that the command queue 245 divided into the fixed number of queue regions is used, the partial queue regions in the command queue 245 may not be used or a space of the command queue 245 may be insufficient.

In the embodiment, when the configuration of the electronic apparatus 10, for example, the number of channels, the number of nonvolatile memory devices coupled to each channel, or the number of plane groups included in each nonvolatile memory device is changed, the command queue 245 may be used by dividing the command queue 245 into the queue regions according to the changed configuration.

Figure 5A:
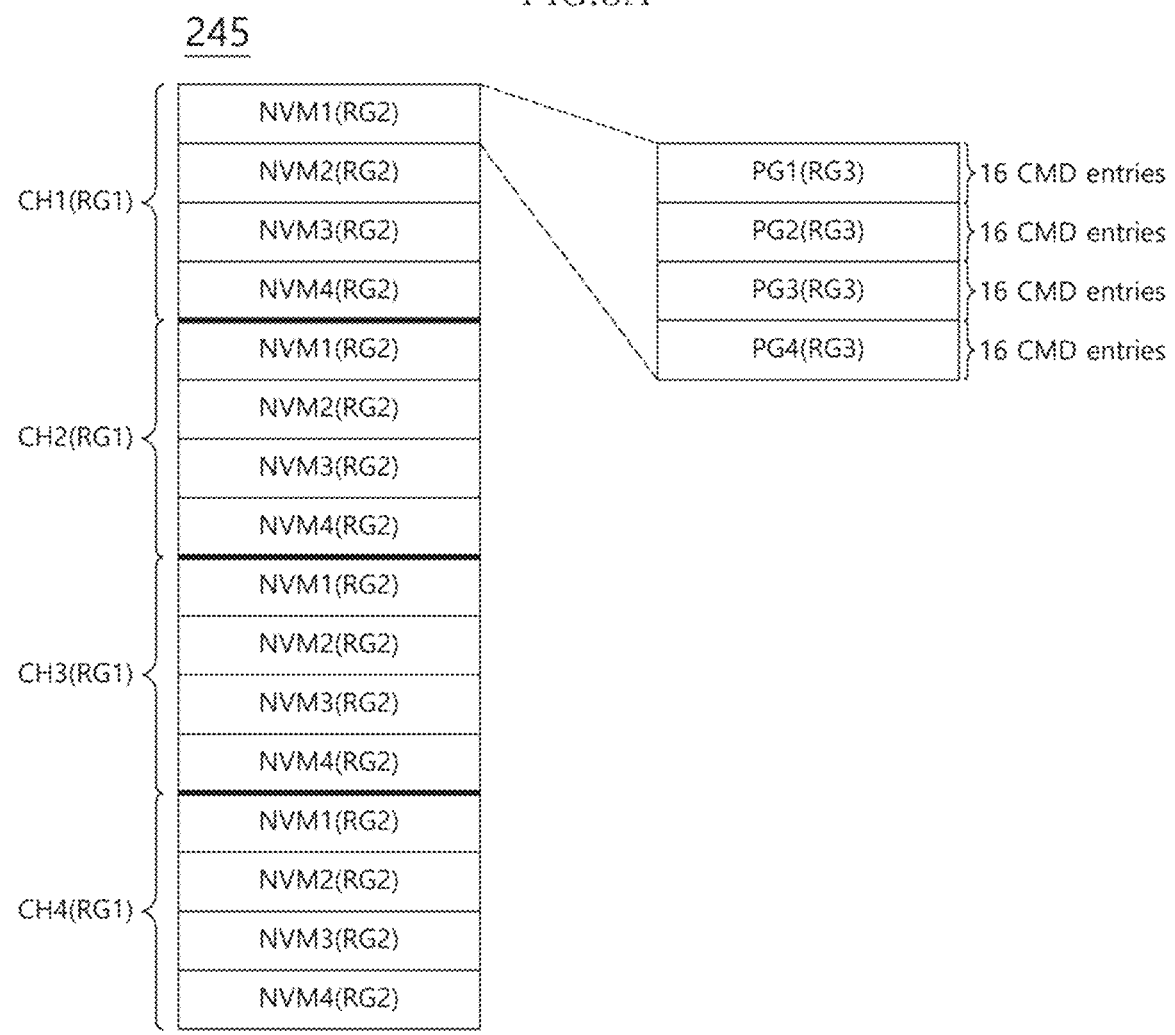
FIG. 5A is a diagram illustrating an example that a command queue is divided into a plurality of queue regions in accordance with an embodiment of the present disclosure.

FIG. 5A is a diagram illustrating an example that a command queue is divided into a plurality of queue regions in accordance with an embodiment of the present disclosure. For clarity, it is assumed that the electronic apparatus 10 includes four channels CH1 to CH4 which couple the controller 200 and the data storage device 100, four nonvolatile memory devices NVM1 to NVM4 share each of the channels CH1 to CH4, and each of the nonvolatile memory devices NVM1 to NVM4 includes four plane groups PG1 to PG4. Further, it is assumed that the command queue 245 is allocated with a size which can queue a maximum of 1024 command entries (CMD entries).

Referring to FIG. 5A, the queue division instruction driven by the processor 220 may divide the command queue 245 into four first queue regions RG1 corresponding to the channels CH1 to CH4, divide each of the first queue regions RG1 into four second queue regions RG2 corresponding to four nonvolatile memory devices NVM1 to NVM4, and divide each of the second queue regions RG2 into four third queue regions RG3 corresponding to four plane groups PG1 to PG4. Accordingly, the command queue 245 in FIG. 5A may include 64 third queue regions RG3. For example, the total number of queue regions included in the command queue 245 may be 64. Since the command queue 245 queues a maximum of 1024 commend entries (CMD entries), each of the third queue regions RG3 may queue 16 command entries (16 CMD entries).

Figure 5B:
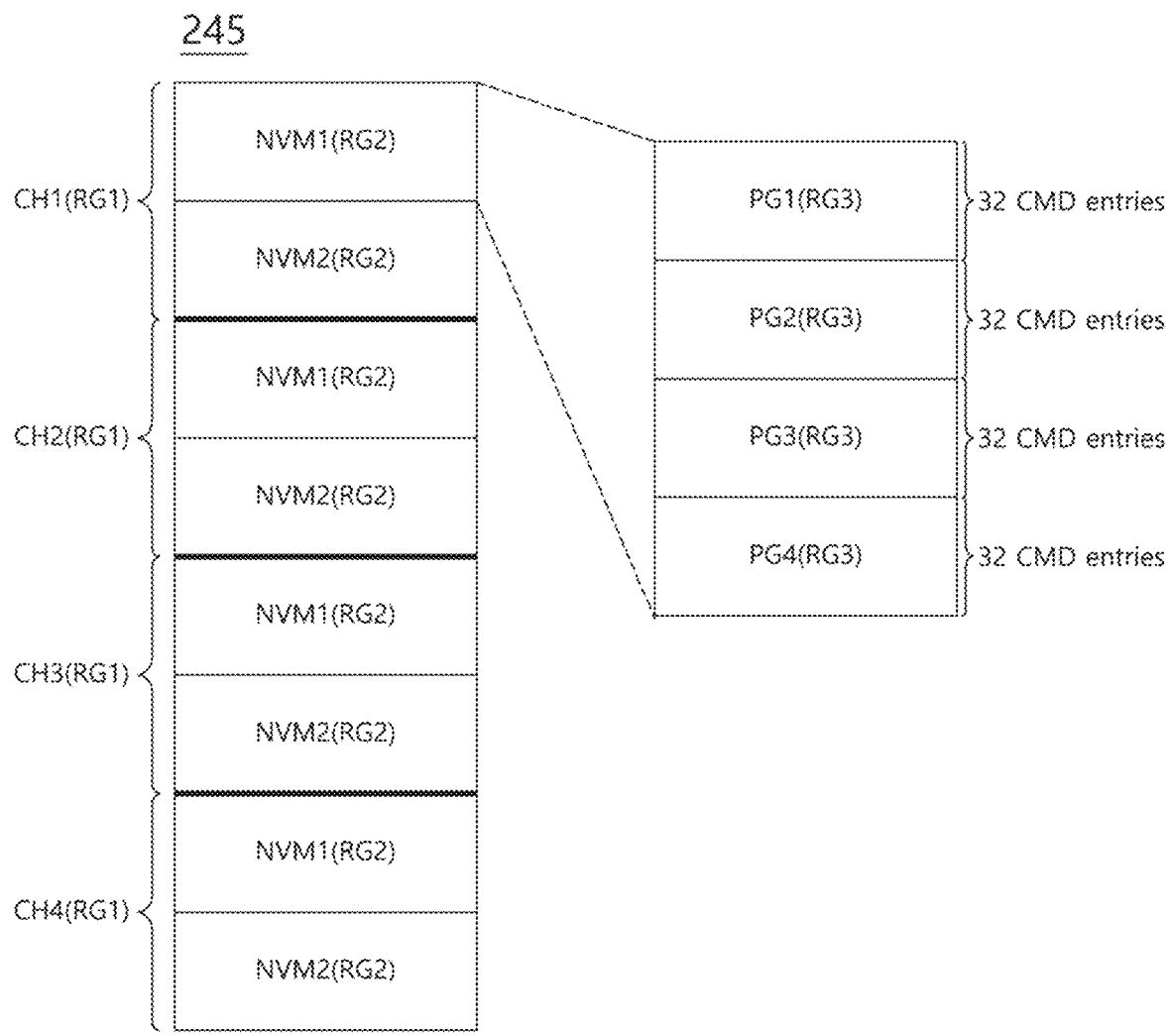
FIG. 5B is a diagram illustrating an example that a command queue is divided into a plurality of queue regions in accordance with an embodiment of the present disclosure.

FIG. 5B is a diagram illustrating an example that a command queue is divided into a plurality of queue regions in accordance with an embodiment of the present disclosure. For clarity, it is assumed that the electronic device 10 includes four channels CH1 to CH4 which couple the controller 200 and the data storage device 100, two nonvolatile memory devices NVM1 and NMV2 share each of the channels CH1 to CH4, and each of the nonvolatile memory devices NVM1 and NVM2 includes four plane groups PG1 to PG4.

Referring to FIG. 5B, the queue division instruction driven by the processor 220 may divide the command queue 245 into four first queue regions RG1 corresponding to four channels CH1 to CH4, divide each of the first queue regions RG1 into two second queue regions RG2 corresponding to two nonvolatile memory devices NVM1 and NVM2, and divide each of the second queue regions RG2 into four third queue regions RG3 corresponding four plane groups PG1 to PG4. Accordingly, the command queue 245 may include 32 third queue regions RG3 and each of the third queue regions RG3 may queue 32 command entries (32 CMD entries).

Referring to FIGS. 5A and 5B, it can be seen that when the number of channels, the number of nonvolatile memory devices sharing each channel, or the number of plane groups included in each nonvolatile memory device is changed, the number of third queue regions RG3 and the number of command entries stored in each of the third queue regions RG3 are varied. The number of third queue region RG3 in the command queue 245 may correspond to the total number of plane groups included in the data storage device 100.

When at least one number among the number of channels of the electronic apparatus 10, the number of nonvolatile memory devices sharing each channel, and the number of plane groups is changed, the number of third queue regions RG3 and the size of each third queue region RG3 in the command queue 245 may be varied. The variation in the size of the third queue region RG3 may mean that the number of command entries queued in the third queue regions RG3 is varied. Accordingly, even when the configuration of the electronic apparatus 10 is changed, the command queue 245 may be divided to include the queue regions corresponding to the changed configuration.

The write pointer register 250 may store a value indicating a position that the command entry received from a host apparatus is to be stored. The write pointer register 250 may include a plurality of write pointers WP. The plurality of write pointers WP may be provided according to the number of third queue regions (see RG3 of FIG. 5A) which can be maximally included in the command queue 245.

Figure 6A:
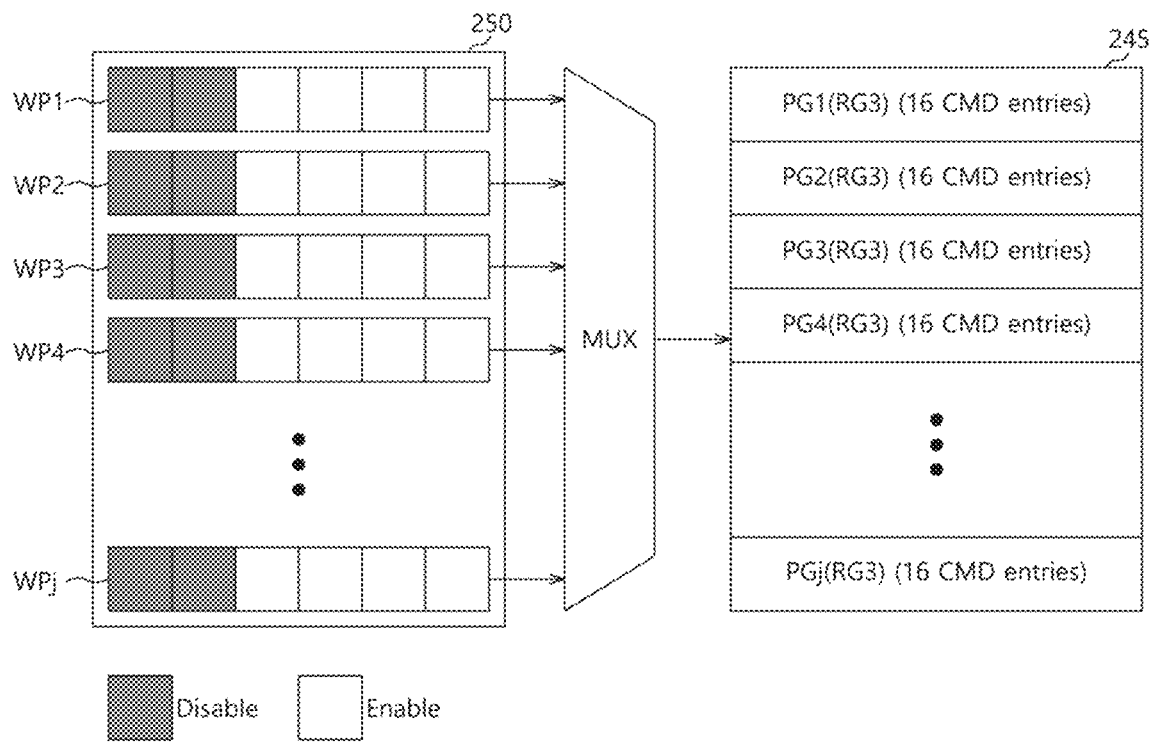
FIGS. 6A and 6B are diagrams illustrating examples that sizes of write pointers are changed according to change in the number of command entries queued in third queue regions of a command queue in accordance with an embodiment of the present disclosure.

As illustrated in FIG. 6A, when the number of third queue regions RG3 which can be maximally included in the command queue 245 is j, the write pointer register 250 may include j write pointers WP1 to WPj. Herein, j may be a natural number of 1 or more.

One write pointer WP may match with one third queue region RG3. Each of the write pointers WP may store a value corresponding to the number of command entries which can be maximally queued in the corresponding third queue region RG3. Although the write pointers WP configured of 6 bits so as to indicate '0' to '63' are illustrated in FIGS. 6A and 6B, the number of bits of the write pointer WP is not limited thereto.

Each of the bits in each of the write points WP1 to WPj may be enabled or disabled through the pointer change instruction driven by the processor 220. The pointer change instruction may enable or disable partial bits among the bits in each of the write points WP1 to WPj as the number of command entries queued in each third queue region RG3 of the command queue 245 is varied.

When the number of third queue regions RG3 in the command queue 245 is increased, the sizes of the third queue regions RG3 may be reduced and the number of command entries queued in each third queue region RG3 may be reduced. Accordingly, the pointer change instruction driven by the processor 220 may sequentially disable the bits of each of the write pointers WP1 to WPj from the most significant bit. When the number of third queue regions RG3 in the command queue 245 is reduced, the sizes of the third queue regions RG3 may be increased and the number of command entries queued in each third queue region RG3 may be increased. Accordingly, the pointer change instruction driven by the processor 220 may sequentially enable the disabled bits of each of the write pointers WP1 to WPj from the least significant bit.

Figure 6B:
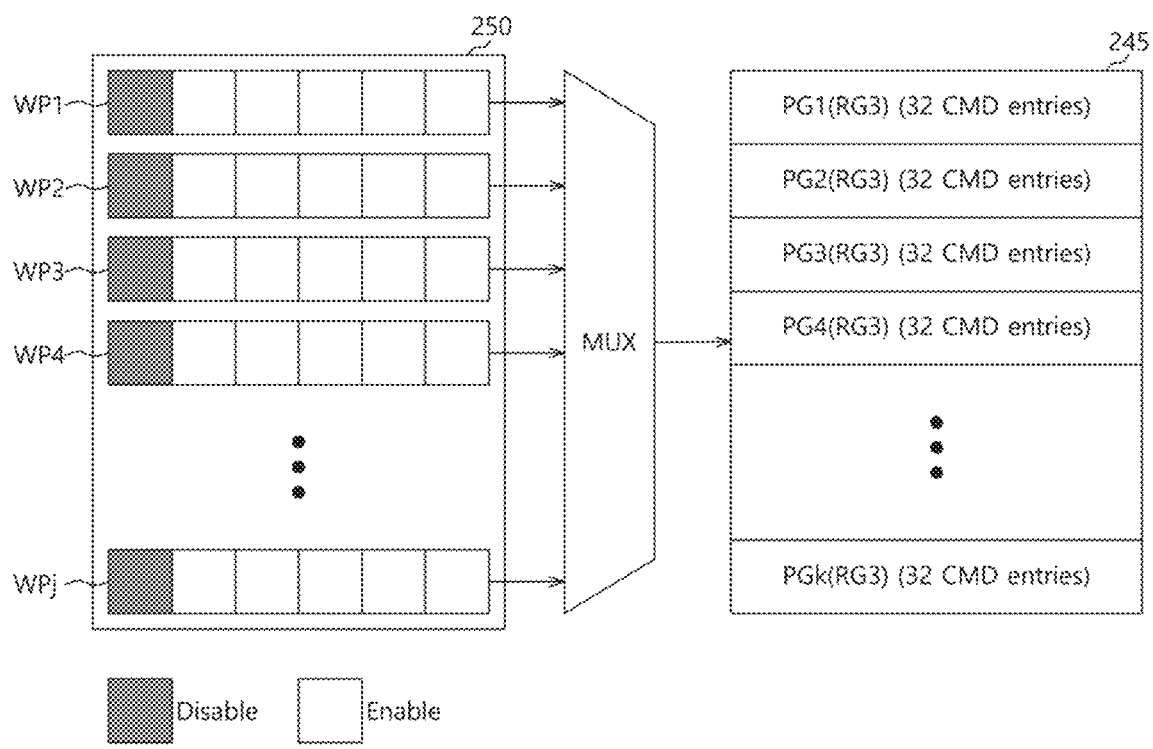

FIGS. 6A and 6B are diagrams illustrating an example that sizes of the write pointers WP1 to WPj in the write pointer register 250 are changed according to change in the number of command entries to be queued in third queue regions RG3 of the command queue 245 in accordance with an embodiment of the present disclosure.

The example that the command queue 245 includes j third queue regions RG3 and each of the third queue regions RG3 queues 16 command entries is illustrated in FIG. 6A. For clarity, it is assumed that the maximum number of third queue regions RG3 which can be included in the command queue 245 is j. Herein, j may be a natural number of 1 or more.

The write pointer register 250 may include j write pointers WP1 to WPj. Since each of the third queue regions RG3 may queue 16 command entries, the most significant bit (for example, sixth bit) and next upper bit (for example, fifth bit) in the first to j-th write pointers WP1 to WPj may be disabled and the remaining bits (for example, first to fourth bits) may be enabled. Accordingly, the first to j-th write pointers WP1 to WPj may store values of from '0' to '15'.

The values output from the first to j-th write pointers WP1 to WPj may be input to a multiplexer MUX and the multiplexer MUX may select one among the j values input from the first to j-th write pointers WP1 to WPj and output the selected value. The value output from the multiplexer MUX may be an address corresponding to a position in which a command is to be queued. An output terminal of the multiplexer MUX may be coupled to an address port of the memory 240 including the command queue 245 and the queuing instruction driven by the processor 220 may confirm a position in which the command is to be queued from the output terminal of the multiplexer MUX coupled to the address port and queue the command to the corresponding position.

FIG. 6B illustrates the example that the command queue 245 includes k third queue regions RG3 and each of the third queue regions RG3 queues 32 command entries. Herein, k may be a natural number of 1 or more and may be smaller than j.

The write pointer register 250 may include j write pointers WP1 to WPj. Even when the number of third queue regions RG3 of the command queue 245 is changed, the number of write pointers included in the write pointer register 250 may not be changed. Since each of the third queue regions RG3 may queue 32 command entries, the most significant bit (for example, sixth bit) in the first to j-th write pointers WP1 to WPj may be disabled and the remaining bits (first to fifth bits) may be enabled. The first to j-th write pointes WP1 to WPj may store values of from '0' to '31'.

Figure 7A:
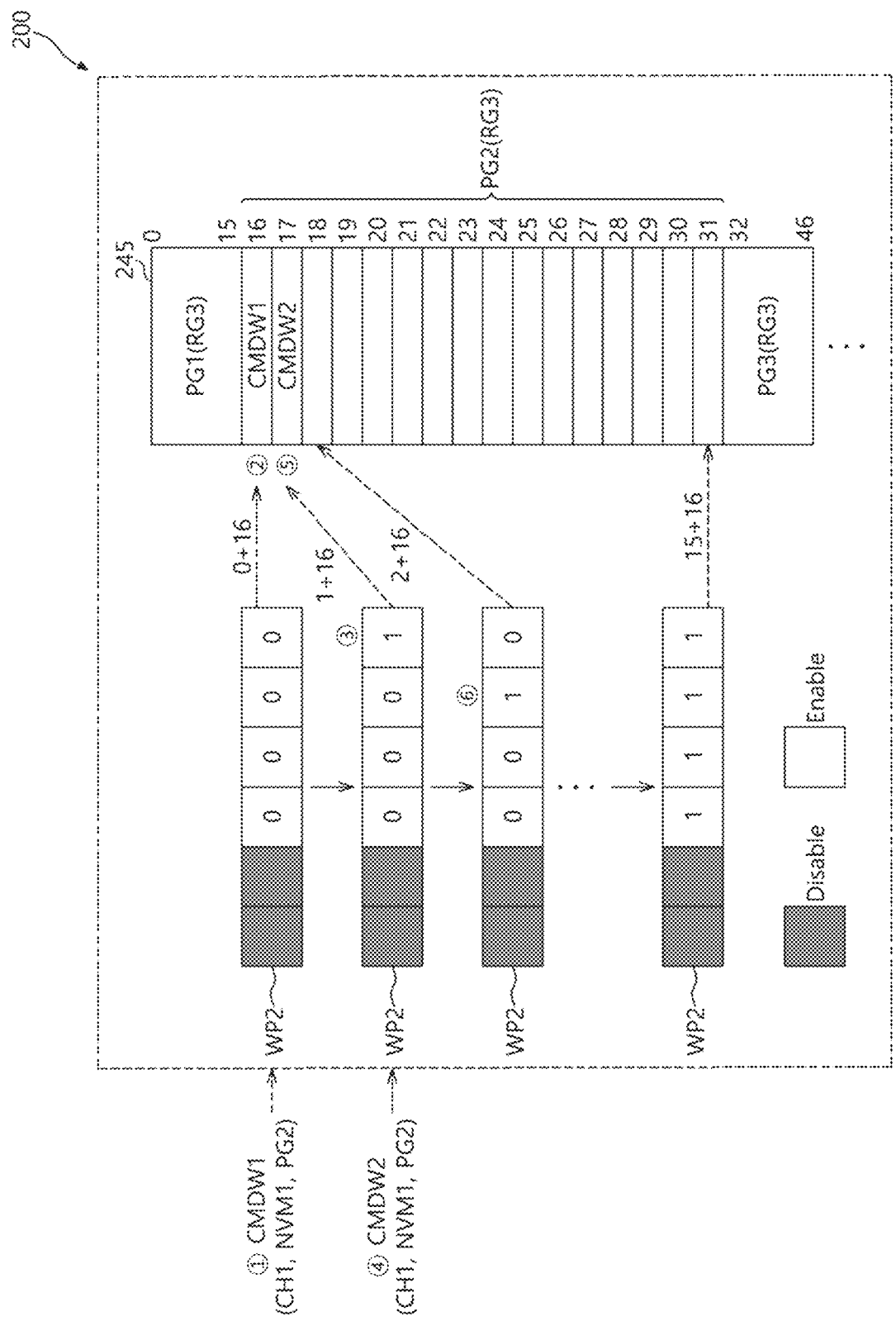

FIGS. 7A and 7B are diagrams illustrating a method of storing a command entry in the command queue 245 with reference to a write pointer register in accordance with an embodiment of the present disclosure. For simplification of the drawings, the multiplexer MUX will be omitted.

The command queue 245 which includes third queue regions RG3 in which 16 command entries are queued is illustrated in FIG. 7A. The second write pointer WP2 may be in a state that first to fourth bits are enabled.

When a first write command CMDW1 for the second plane group PG2 of the first nonvolatile memory device NVM1 coupled to the first channel CH1 is received from a host apparatus (not shown) (①) the queuing instruction driven by the processor 220 may confirm a value stored in the corresponding second write pointer WP2. Since the value of the second write pointer WP2 is '0 (zero)', the queuing instruction may queue the first write command CMDW1 in a position corresponding to a result value that '0 (zero)' is added to '16' as a start address of the third queue region RG3 of the command queue 245 corresponding to the second plane group PG2 of the first nonvolatile memory device NVM1 coupled to the first channel CH1, for example, the position that the address is 16 (②). Next, the value of the second write pointer WP2 may be '1' (③).

When the second write command CMDW2 for the second plane group PG2 of the first nonvolatile memory device NVM1 coupled to the first channel CH1 is received from the host apparatus (④), the queuing instruction driven by the processor 220 may queue the second write command CMDW2 in a position in which an address is '17' by adding '1' as a value of the corresponding second write pointer WP2 to '16' as the start address of the third queue region RG3 of the command queue 245 corresponding to the second plane group PG2 of the first nonvolatile memory device NVM1 coupled to the first channel CH1 (⑤). Next, the value of the second write pointer WP2 may be '2' (⑥).

The command queue 245 which includes the third queue regions RG3 in which 32 command entries are queued is illustrated in FIG. 7B. The second write pointer WP2 may be in a state that the first to fifth bits are enabled.

When the first write command CMDW1 for the second plane group PG2 of the first nonvolatile memory device NVM1 coupled to the first channel CH1 is received from a host apparatus (not shown) (①) the queuing instruction driven by the processor 220 may confirm a value of the corresponding second write pointer WP2. Since the value of the second write pointer WP2 is '0 (zero)', the queuing instruction may queue the first write command CMDW1 in a position corresponding a result value that '0 (zero)' is added to '32' as a start address of the third queue region RG3 of the command queue 245 corresponding to the second plane group PG2 of the first nonvolatile memory device NVM1 coupled to the first channel CH1, for example, the position that the address is 32 (②). Next, the value of the second write pointer WP2 may be '1' (③).

When the second write command CMDW2 for the second plane group PG2 of the first nonvolatile memory device NVM1 coupled to the first channel CH1 is received from the host apparatus (④), the queuing instruction driven by the processor 220 may queue the second write command CMDW2 in a position in which an address is '33' by adding '1' as the value of the corresponding second write pointer WP2 to '32' as the start address of the third queue region RG3 of the command queue 245 corresponding to the second plane group PG2 of the first nonvolatile memory device NVM1 coupled to the first channel CH1 (⑤). Next, the value of the second write pointer WP2 may be '2' (⑥).

Since the write pointer register 250 includes the write pointers WP corresponding to the number of third queue regions RG3 which can be maximally included in the command queue 245, the portion of the write pointers WP may be not used when the number of third queue regions RG3 included in the command queue 245 is equal to or smaller than the maximum number.

The read pointer register 260 may store the value indicating a position in which a command entry to be fetched next among the command entries queued in the command queue 245 is stored. Although not specifically illustrated in the drawings, the read pointer register 260 may include a plurality of read pointers (not shown).

The read pointer register 260 may be implemented and operated as the same as the write pointer register 250. The plurality of read pointers may be provided according to the number of write pointers. The values output from the plurality of read pointers may be input to a multiplexer (not shown) and the multiplexer may select one of the values inputted from the plurality of read pointers and output the selected value. The value output from the multiplexer may be an address corresponding to a position in which a command to be fetched is queued. An output terminal of the multiplexer may be coupled to an address port of the memory 240 including the command queue 245 and the dequeuing instruction driven by the processor 220 may confirm the position that the command to be fetched is queued from the output terminal of the multiplexer coupled to the address port and fetch the command stored in the corresponding position. Address ports of the memory 240 coupled to the write pointer register 250 and the read pointer register 260 may be different from each other. For example, the address port coupled to the write pointer address 250 may be a write address port and the address port coupled to the read pointer register 260 may be a read address port.

The read pointer may have the same number of bits as that of the write pointer WP. Each bit of the read pointer may be enabled or disabled through the pointer change instruction driven by the processor 220.

When the number of command entries queued in the third queue regions RG3 of the command queue 245 is increased, the pointer change instruction may sequentially enable the disabled bits in the read pointer from the least significant bit. When the number of command entries queued in the third queue regions RG3 of the command queue 245 is reduced, the pointer change instruction may sequentially disable the enabled bits in the read pointer from the most significant bit.

The control signal generator 270 may receive the fetched command entry from the command queue 245 and generate a control signal to be provided to the data storage device 100 based on the received command entry. The control signal may include a command, an address, and the like. The control signal generator 270 may output the generated control signal and the output control signal may be provided to the data storage device 100 through the channel by the memory interface 230.

FIG. 8a is a flowchart illustrating an operation method of an electronic apparatus in accordance with an embodiment of the present disclosure and FIG. 8B is a detailed flowchart illustrating a process of confirming plane group information of a data storage device in operation S820 of FIG. 8A. FIGS. 8A and 8B are diagrams explaining a method of allocating a portion of the memory 240 as the command queue 245 and dividing the command queue 245 to have a plurality of queue regions corresponding to the change in the number of plane groups of the data storage device 100 in the operation method of an electronic apparatus 10. The operation method of an electronic apparatus in accordance with the embodiment will be described with reference to FIGS. 8A and 8B with FIGS. 1 to 7B.

In operation S810, the processor 220 of the controller 200 may allocate the command queue 245 within the memory 240 by driving the queue allocation instruction loaded into the memory 240.

In operation 820, the processor 220 may confirm the plane group information of the data storage device 100 by driving the information confirm instruction loaded into the memory 240. The operation of confirming the plane group information will be described in detail with reference to FIG. 8B.

In operation 821, the processor 220 may confirm the number of channels CH which couple the controller 200 and the data storage device 100 by driving the information confirm instruction.

In operation S823, the processor 220 may confirm the number of nonvolatile memory devices NVM sharing each channel CH by driving the information confirm instruction.

In operation S825, the processor 220 may confirm the number of plane groups PG included in each nonvolatile memory device NVM by driving the information confirm instruction.

In operation S827, the processor 220 may define the number of plane groups for the data storage device 100 (for example, the total number of plane groups included in the data storage device 100) based on the number of channels CH, the number of nonvolatile memory devices NVM, and the number of plane groups PG confirmed in operations S821, S823, and S825 by driving the information confirm instruction.

In operation S830, the processor 220 may define the command queue 245 by dividing the command queue 245 to have a plurality of queue regions RG1, RG2, and RG3 corresponding to the plane group information of the data storage device 100 by driving the queue division instruction loaded into the memory 240. The plurality of queue regions RG1, RG2, and RG3 may include a plurality of first queue regions RG1 corresponding to the number of channels CH, a plurality of second queue regions RG2 corresponding to the number of nonvolatile memory devices NVM sharing each channel CH, and a plurality of third queue regions RG3 corresponding to the number of plane groups PG included in each nonvolatile memory device NVM.

In operation S840, the processor 220 may change sizes of the pointer registers by driving the pointer change instruction loaded into the memory 240. The pointer registers may include the write pointer register 250 including a plurality of write pointers and the read pointer register 260 including a plurality of read pointers. The changing of the sizes of the pointer registers may be performed by enabling or disabling partial bits with respect to the plurality of write pointers included in the write pointer register 250 and the plurality of read pointers included in the read pointer register 260. The changing of the sizes of the pointer registers has been described above in detail and thus detailed description thereof will be omitted.

In operation S850, when a command is received from a host apparatus, the processor 220 may analyze the command received from the host apparatus and queue the command in the queue region (for example, third queue region RG3) matching with the corresponding plane group by driving the queuing instruction loaded into the memory 240.

Figure 9:
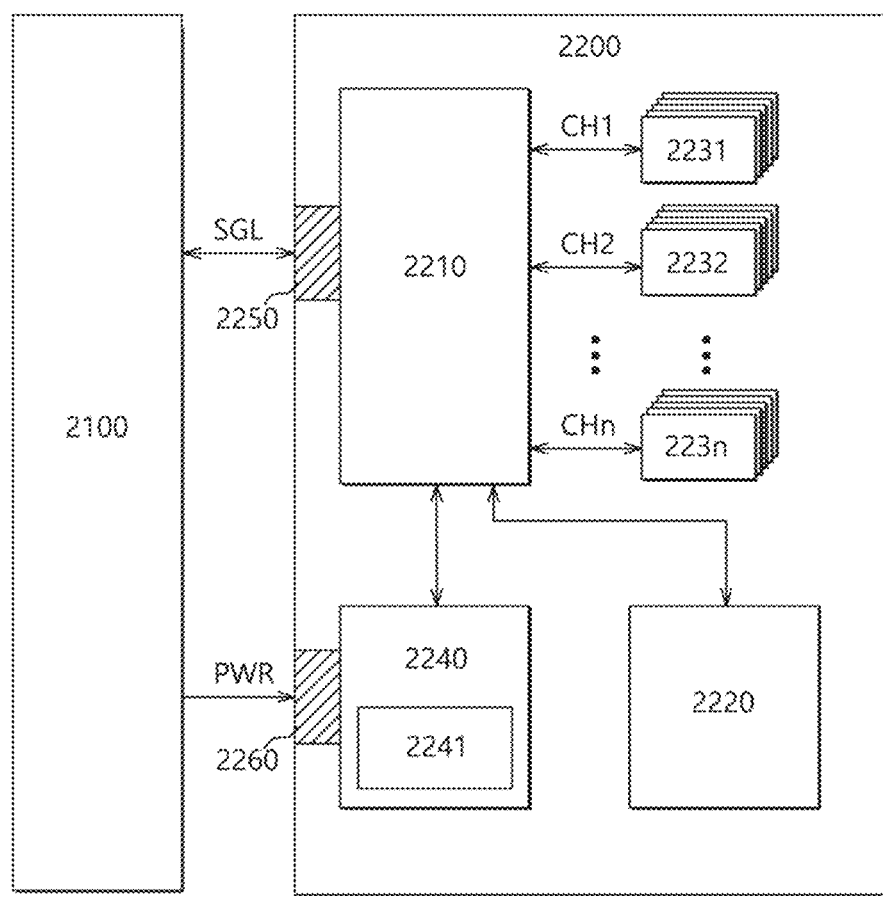
FIG. 9 is a diagram illustrating a data processing system including a solid-state drive (SSD) in accordance with an embodiment of the present disclosure.

FIG. 9 is a diagram illustrating a data processing system including a solid-state drive (SSD) in accordance with an embodiment of the present disclosure. Referring to FIG. 9, a data processing system 2000 may include a host apparatus 2100 and an SSD 2200.

The SSD 2200 may include a controller 2210, a buffer memory device 2220, nonvolatile memory devices 2231 to 223n, a power supply 2240, a signal connector 2250, and a power connector 2260.

The controller 2210 may control an overall operation of the SSD 2220.

The buffer memory device 2220 may temporarily store data to be stored in the nonvolatile memory devices 2231 to 223n. The buffer memory device 2220 may temporarily store data read from the nonvolatile memory devices 2231 to 223n. The data temporarily stored in the buffer memory device 2220 may be transmitted to the host apparatus 2100 or the nonvolatile memory devices 2231 to 223n according to control of the controller 2210.

The nonvolatile memory devices 2231 to 223n may be used as a storage medium of the SSD 2200. The nonvolatile memory devices 2231 to 223n may be coupled to the controller 2210 through a plurality of channels CH1 to CHn. One or more nonvolatile memory devices may be coupled to one channel. The nonvolatile memory devices coupled to the one channel may be coupled to the same signal bus and the same data bus.

The power supply 2240 may provide power PWR input through the power connector 2260 to the inside of the SSD 2200. The power supply 2240 may include an auxiliary power supply 2241. The auxiliary power supply 2241 may supply the power so that the SSD 2200 is normally terminated even when sudden power-off occurs. The auxiliary power supply 2241 may include large capacity capacitors capable of charging the power PWR.

The controller 2210 may exchange a signal SGL with the host apparatus 2100 through the signal connector 2250. The signal SGL may include a command, an address, data, and the like. The signal connector 2250 may be configured of various types of connectors according to an interfacing method between the host apparatus 2100 and the SSD 2200.

Figure 10:
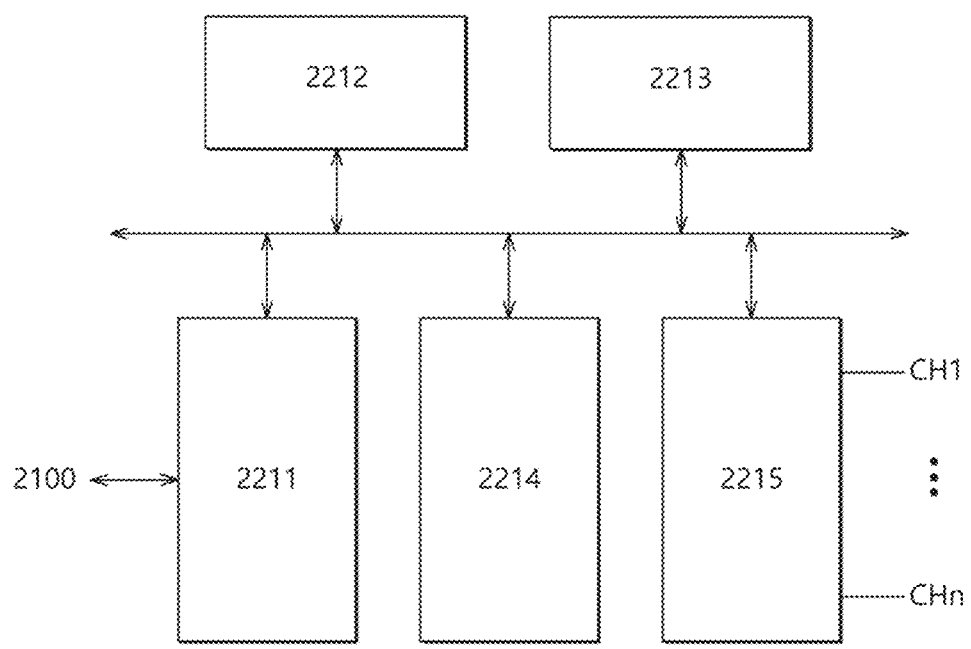
FIG. 10 is a diagram illustrating an exemplary configuration of a controller employed in the data processing system of FIG. 9.

FIG. 10 is a diagram illustrating the controller 2210 of FIG. 9. Referring to FIG. 10, the controller 2210 may include a host interface unit 2211, a control unit 2212, a random-access memory (RAM) 2213, an error correction code (ECC) unit 2214, and a memory interface unit 2215.

The host interface unit 2211 may perform interfacing between the host apparatus 2100 and the SSD 2200 according to a protocol of the host apparatus 2100. For example, the host interface unit 2211 may communicate with the host apparatus 2100 through any one among a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, a PCI Express (PCI-E) protocol, and a universal flash storage (UFS) protocol. The host interface unit 2211 may perform a disc emulation function that the host apparatus 2100 recognizes the SSD 2200 as a general-purpose data storage apparatus, for example, a hard disc drive HDD.

The control unit 2212 may analyze and process the signal SGL input from the host apparatus 2100. The control unit 2212 may control operations of internal functional blocks according to firmware and/or software for driving the SDD 2200. The RAM 2213 may be operated as a working memory for driving the firmware or software.

The ECC unit 2214 may generate parity data for the data to be transferred to the nonvolatile memory devices 2231 to 223n. The generated parity data may be stored in the nonvolatile memory devices 2231 to 223n together with the data. The ECC unit 2214 may detect errors for data read from the nonvolatile memory devices 2231 to 223n based on the parity data. When detected errors are within a correctable range, the ECC unit 2214 may correct the detected errors.

The memory interface unit 2215 may provide a control signal such as a command and an address to the nonvolatile memory devices 2231 to 223n according to control of the control unit 2212. The memory interface unit 2215 may exchange data with the nonvolatile memory devices 2231 to 223n according to control of the control unit 2212. For example, the memory interface unit 2215 may provide data stored in the buffer memory device 2220 to the nonvolatile memory devices 2231 to 223n or provide data read from the nonvolatile memory devices 2231 to 223n to the buffer memory device 2220.

Figure 11:
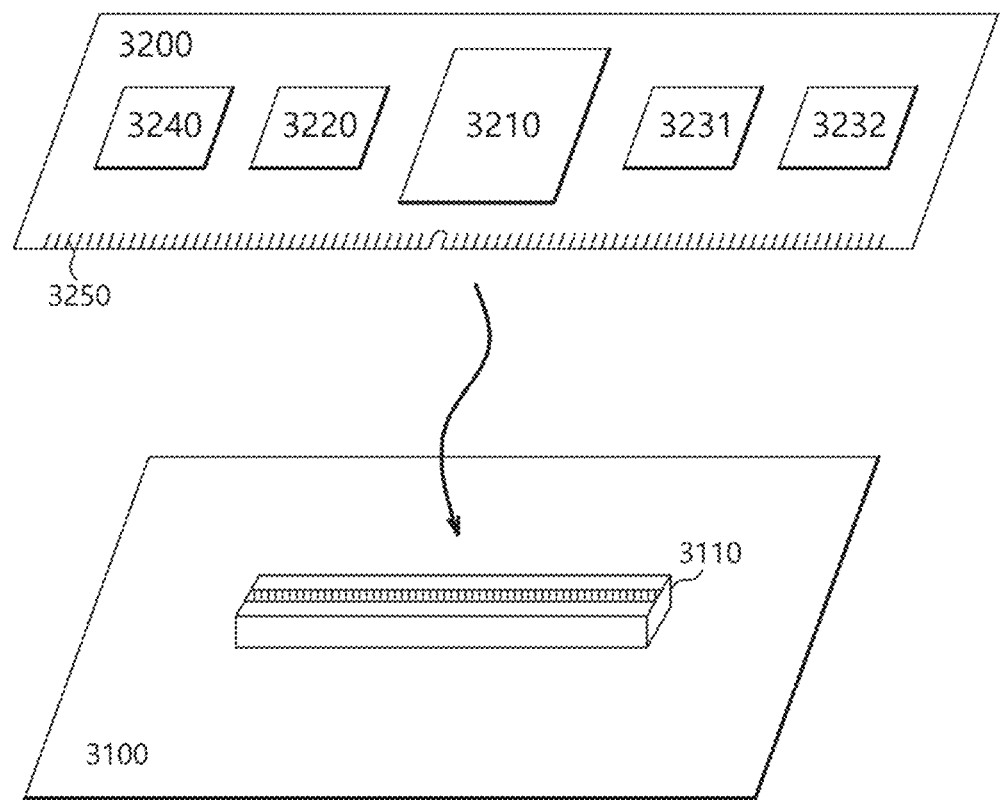
FIG. 11 is a diagram illustrating a data processing system including a data storage apparatus in accordance with an embodiment of the present disclosure.

FIG. 11 is a diagram illustrating a data processing system including a data storage apparatus in accordance with an embodiment of the present disclosure. Referring to FIG. 11, a data processing system 3000 may include a host apparatus 3100 and a data storage apparatus 3200.

The host apparatus 3100 may be configured in a board form such as a printed circuit board (PCB). Although not shown in FIG. 11, the host apparatus 3100 may include internal functional blocks configured to perform functions of the host apparatus 3100.

The host apparatus 3100 may include a connection terminal 3110 such as a socket, a slot, or a connector. The data storage apparatus 3200 may be mounted on the connection terminal 3110.

The data storage apparatus 3200 may be configured in a board form such as a PCB. The data storage apparatus 3200 may refer to a memory module or a memory card. The data storage apparatus 3200 may include a controller 3210, a buffer memory device 3220, nonvolatile memory devices 3231 to 3232, a power management integrated circuit (PMIC) 3240, and a connection terminal 3250.

The controller 3210 may control an overall operation of the data storage apparatus 3200. The controller 3210 may have the same configuration as the controller 2210 illustrated in FIG. 10.

The buffer memory device 3220 may temporarily store data to be stored in the nonvolatile memory devices 3231 and 3232. The buffer memory device 3220 may temporarily store data read from the nonvolatile memory devices 3231 and 3232. The data temporarily stored in the buffer memory device 3220 may be transmitted to the host apparatus 3100 or the nonvolatile memory devices 3231 and 3232 according to control of the controller 3210.

The nonvolatile memory devices 3231 and 3232 may be used as a storage medium of the data storage apparatus 3200.

The PMIC 3240 may provide power input through the connection terminal 3250 to the inside of the data storage apparatus 3200. The PMIC 3240 may manage the power of the data storage apparatus 3200 according to control of the controller 3210.

The connection terminal 3250 may be coupled to the connection terminal 3110 of the host apparatus 3100. A signal such as a command, an address, and data and power may be transmitted between the host apparatus 3100 and the data storage apparatus 3200 through the connection terminal 3250. The connection terminal 3250 may be configured in various forms according to an interfacing method between the host apparatus 3100 and the data storage apparatus 3200. The connection terminal 3250 may be arranged in any one side of the data storage apparatus 3200.

Figure 12:
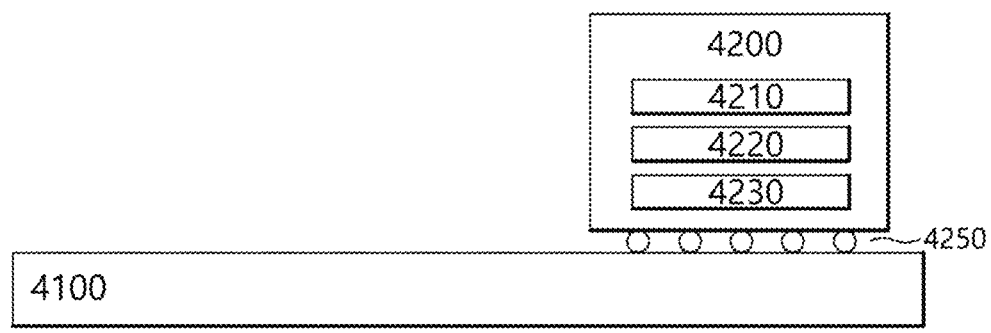
FIG. 12 is a diagram illustrating a data processing system including a data storage apparatus in accordance with an embodiment of the present disclosure.

FIG. 12 is a diagram illustrating a data processing system including a data storage apparatus in accordance with an embodiment of the present disclosure. Referring to FIG. 12, a data processing system 4000 may include a host apparatus 4100 and a data storage apparatus 4200.

The host apparatus 4100 may be configured in a board form such as a PCB. Although not shown in FIG. 12, the host apparatus 4100 may include internal functional blocks configured to perform functions of the host apparatus 4100.

The data storage apparatus 4200 may be configured in a surface mounting packaging form. The data storage apparatus 4200 may be mounted on the host apparatus 4100 through a solder ball 4250. The data storage apparatus 4200 may include a controller 4210, a buffer memory device 4220, and a nonvolatile memory device 4230.

The controller 4210 may control an overall operation of the data storage apparatus 4200. The controller 4210 may have the same configuration as the controller 2210 illustrated in FIG. 10.

The buffer memory device 4220 may temporarily store data to be stored in the nonvolatile memory device 4230. The buffer memory device 4220 may temporarily store data read from the nonvolatile memory device 4230. The data temporarily stored in the buffer memory device 4220 may be transmitted to the host apparatus 4100 or the nonvolatile memory device 4230 under the control of the controller 4210.

The nonvolatile memory device 4230 may be used as a storage medium of the data storage apparatus 4200.

Figure 13:
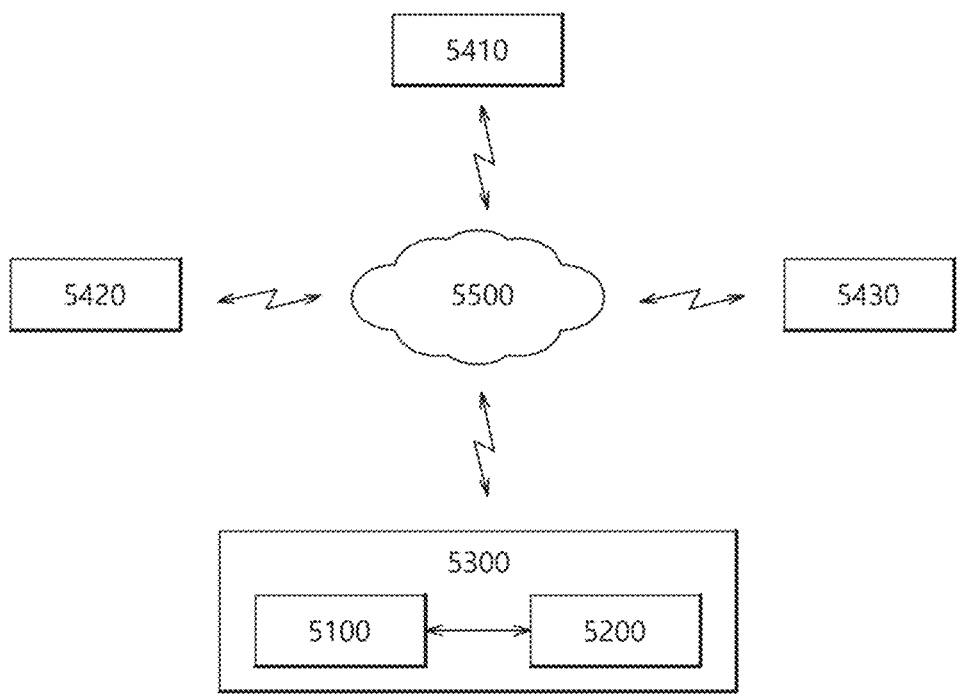
FIG. 13 is a diagram illustrating a network system including a data storage apparatus in accordance with an embodiment of the present disclosure.

FIG. 13 is a diagram illustrating a network system 5000 including a data storage apparatus in accordance with an embodiment of the present disclosure. Referring to FIG. 13, the network system 5000 may include a server system 5300 and a plurality of client systems 5410 to 5430 which are coupled through a network 5500.

The server system 5300 may serve data in response to requests of the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host apparatus 5100 and a data storage apparatus 5200. The data storage apparatus 5200 may be configured of the electronic apparatus 10 of FIG. 1, the data storage apparatus 2200 of FIG. 9, the data storage apparatus 3200 of FIG. 11, or the data storage apparatus 4200 of FIG. 12.

Figure 14:
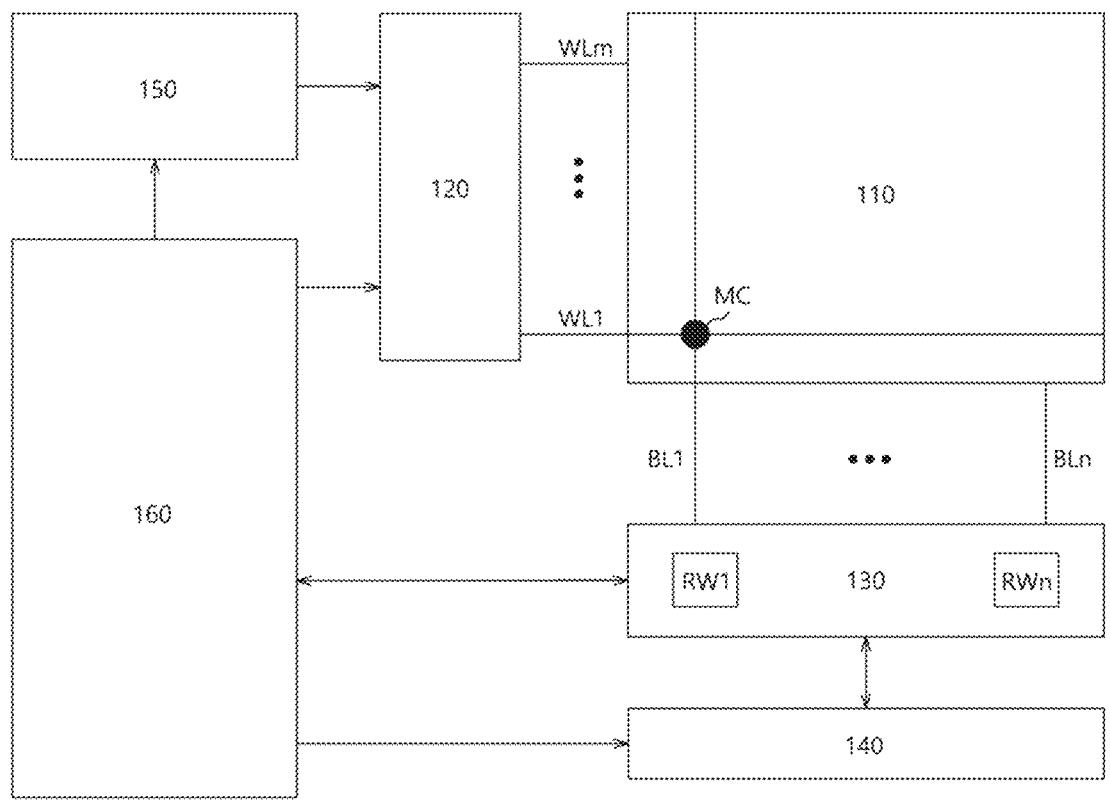
FIG. 14 is a block diagram illustrating a nonvolatile memory device included in a data storage apparatus in accordance with an embodiment of the present disclosure.

FIG. 14 is a block diagram illustrating a nonvolatile memory device included in the data storage device 100 in accordance with an embodiment of the present disclosure. Referring to FIG. 14, the nonvolatile memory device may include a memory cell array 110, a row decoder 120, a column decoder 140, a data read/write block 130, a voltage generator 150, and a control logic 160.

The memory cell array 110 may include memory cells MC arranged in regions in which word lines WL1 to WLm and bit lines BL1 to BLn cross to each other.

The row decoder 120 may be coupled to the memory cell array 110 through the word lines WL1 to WLm. The row decoder 120 may operate under the control of the control logic 160. The row decoder 120 may decode an address provided from an external apparatus (not shown). The row decoder 120 may select and drive the word lines WL1 to WLm based on a decoding result. For example, the row decoder 120 may provide a word line voltage provided from the voltage generator 150 to the word lines WL1 to WLm.

The data read/write block 130 may be coupled to the memory cell array 110 through the bit lines BL1 to BLn. The data read/write block 130 may include read/write circuits RW1 to RWn corresponding to the bit lines BL1 to BLn. The data read/write block 130 may operate according to control of the control logic 160. The data read/write block 130 may operate as a write driver or a sense amplifier according to an operation mode. For example, the data read/write block 130 may operate as the write driver configured to store data provided from an external apparatus in the memory cell array 110 in a write operation. In another example, the data read/write block 130 may operate as the sense amplifier configured to read data from the memory cell array 110 in a read operation.

The column decoder 140 may operate though control of the control logic 160. The column decoder 140 may decode an address provided from an external apparatus (not shown). The column decoder 140 may couple the read/write circuits RW1 to RWn of the data read/write block 130 corresponding to the bit lines BL1 to BLn and data input/output (I/O) lines (or data I/O buffers) based on a decoding result.

The voltage generator 150 may generate voltages used for an internal operation of the nonvolatile memory device. The voltages generated through the voltage generator 150 may be applied to the memory cells of the memory cell array 110. For example, a program voltage generated in a program operation may be applied to word lines of memory cells in which the program operation is to be performed. In another example, an erase voltage generated in an erase operation may be applied to well regions of memory cells in which the erase operation is to be performed. In another example, a read voltage generated in a read operation may be applied to word lines of memory cells in which the read operation is to be performed.

The control logic 160 may control an overall operation of the nonvolatile memory device based on a control signal provided from an external apparatus. For example, the control logic 160 may control an operation of the nonvolatile memory device such as a read operation, a write operation, an erase operation of the nonvolatile memory device.

The above described embodiments of the present invention are intended to illustrate and not to limit the present invention. Various alternatives and equivalents are possible. The invention is not limited by the embodiments described herein. Nor is the invention limited to any specific type of semiconductor device. Other additions, subtractions, or modifications are obvious in view of the present disclosure and are intended to fall within the scope of the appended claims.

What is claimed is:

1. An electronic apparatus comprising:
a data storage device including a plurality of plane groups; and
a controller configured to control the data storage device, wherein the controller includes:
a temporary storage configured to store a command received from a host apparatus;
a processor configured to define a plurality of queue regions corresponding to the plurality of plane groups within the temporary storage, and queue the command for each of the plurality of plane groups to a queue region matching with a corresponding plane group; and
a plurality of pointer registers corresponding to the plurality of queue regions, respectively, and configured to indicate positions of the plurality of queue regions,
wherein the processor changes a number of the queue regions, sizes of the queue regions, and sizes of the pointer registers according to a number of the plane groups.

2. The electronic apparatus of claim 1, wherein the processor allocates a portion of the temporary storage as an entire queue region, and defines the entire queue region by dividing the entire queue region into the plurality of queue regions.

3. The electronic apparatus of claim 2, wherein the entire queue region is allocated with the same size regardless of the number of the plane groups.

4. The electronic apparatus of claim 1, wherein the processor increases the number of the queue regions and reduces a size of each queue region as the number of the plane groups is increased.

5. The electronic apparatus of claim 1, further comprising a plurality of channels which couple the controller and the data storage device, wherein the data storage device includes a plurality of memory groups each including a plurality of nonvolatile memory devices sharing a corresponding channel among the plurality of channels, and
wherein the number of the plane groups is changed according to a number of the channels, a number of the nonvolatile memory devices, and the number of the plane groups included in each nonvolatile memory device.

6. The electronic apparatus of claim 1, wherein the processor changes sizes of the plurality of pointer registers by enabling or disabling partial bits of the plurality of pointer registers according to the number of the plane groups.

7. The electronic of claim 6, wherein the processor sequentially enables the disabled bits of the plurality of pointer registers from a least significant bit as the number of the plane groups is reduced, and sequentially disables the enabled bits of the plurality of pointer registers from a most significant bit as the number of the plane groups is increased.

8. The electronic apparatus of claim 1, wherein the plurality of pointer registers include:
a plurality of write pointer registers storing an address corresponding to a position in which the command is to be queued for the plurality of queue regions; and
a plurality of read pointer registers storing an address corresponding to a position in which the command is to be dequeued for the plurality of queue regions.

9. An electronic apparatus comprising:
a controller; and
a non-transitory machine-readable storage medium including a plurality of plane groups, and configured to store code-type instructions that are driven by the controller,
wherein the code-type instructions include:
an instruction which allocates a portion of a temporary storage included in the controller as an entire queue region;
an instruction which confirms information of the plurality of plane groups of the non-transitory machine-readable storage medium;
an instruction which defines the entire queue region by dividing the entire queue region into the plurality of queue regions corresponding to the plurality of plane groups and having a variable size according to the information of the plurality of plane groups; and
an instruction which analyzes a command received from a host apparatus and stores the analyzed command in a queue region matching with a corresponding plane group,
wherein the controller includes a plurality of pointer registers corresponding to the plurality of queue regions and indicating positions of the queue regions, and
wherein the entire queue region is divided into the plurality of queue regions by changing a number of the queue regions, sizes of the queue regions, and sizes of the pointer registers according to the information of the plurality of plane groups.

10. The electronic apparatus of claim 9, further comprising a plurality of channels which couple the controller and the non-transitory machine-readable storage medium,
wherein the non-transitory machine-readable storage medium includes a plurality of memory groups each including a plurality of nonvolatile memory devices sharing a corresponding channel among the plurality of channels.

11. The electronic apparatus of claim 10, wherein the information of the plurality of plane groups includes a number of the plane groups, and
wherein the number of the plane groups is changed according to a number of the channels, a number of the nonvolatile memory devices, and the number of the plane groups included in each nonvolatile memory device.

12. The electronic apparatus of claim 10, wherein a number of the queue regions is increased and a size of each queue region is reduced as the number of the plane groups is increased.

13. The electronic apparatus of claim 9, wherein the code-type instructions include an instruction which changes sizes of the plurality of pointer registers according to the information for the plurality of plane groups, and
wherein the instruction which changes the sizes of the plurality of pointer registers enables or disables partial bits of the plurality of pointer registers according to the number of the plane groups.

14. An operating method of an electronic apparatus including a data storage device and a controller configured to control an operation of the data storage device, the method comprising:
allocating an entire queue region to a temporary storage included in the controller;
confirming plane group information of the data storage device;
defining the entire queue region by dividing the entire queue region into a plurality of queue regions corresponding to the plane group information and having a variable size; and
analyzing a command received from a host apparatus and storing the command in a corresponding queue region having the variable size,
wherein the controller includes a plurality of pointer registers corresponding to the plurality of queue regions and storing a plurality of bits indicating a position of a corresponding queue region, and
wherein the defining of the entire queue region includes changing a number of the queue regions, sizes of the queue regions, and sizes of the pointer registers according to the plane group information.

15. The method of claim 14, wherein the controller and the data storage device are coupled through a plurality of channels,
wherein the data storage device includes a plurality of nonvolatile memory devices sharing a corresponding channel among the plurality of channels, and each of the nonvolatile memory devices includes a plurality of plane groups, and
wherein the confirming of the plane group information of the data storage device includes:
confirming a number of the channels;
confirming a number of the nonvolatile memory devices sharing the corresponding channel;
conforming a number of the plane groups included in each nonvolatile memory device; and
defining the number of the plane groups for the data storage device based on the number of the channels, the number of the nonvolatile memory devices, and the number of the plane groups.

16. The method of claim 15, wherein the defining of the entire queue region by dividing the entire queue region into the plurality of queue regions includes changing sizes of the plurality of queue regions so that the entire queue region includes the plurality of queue regions corresponding to the number of the plane groups.

17. The method of claim 16, wherein the changing of the sizes of the plurality of queue regions includes:
reducing the sizes of the plurality of queue regions as the number of the plane groups is increased and
increasing the sizes of the plurality of queue regions as the number of the plane groups is reduced.

18. The method of claim 14, wherein the changing of the sizes of the plurality of pointer registers includes sequentially enabling the disabled bits among the plurality of bits of the plurality of pointer registers from a least significant bit as the number of the plane groups is reduced, and wherein the changing of the sizes of the plurality of pointer registers includes sequentially disabling the plurality of bits of the plurality of pointer registers from a most significant bit as the number of the plane groups is increased.

* * * * *